United States Patent [19]

Goedhart

[11] Patent Number: 4,648,332
[45] Date of Patent: Mar. 10, 1987

[54] METHOD OF CLEANING CONTAMINATED SOIL

[75] Inventor: Cornelis Goedhart, Uithoorn, Netherlands

[73] Assignee: Esmil B.V., Amsterdam, Netherlands

[21] Appl. No.: 843,606

[22] Filed: Mar. 25, 1986

[30] Foreign Application Priority Data

Mar. 25, 1985 [NL] Netherlands ............... 8500860

[51] Int. Cl.[4] ............... F23G 5/00
[52] U.S. Cl. ............... 110/346; 110/236; 110/245; 241/DIG. 10
[58] Field of Search ............... 110/236, 245, 346; 241/65, DIG. 10

[56] References Cited

U.S. PATENT DOCUMENTS

| | | | |
|---|---|---|---|
| 4,429,642 | 2/1984 | Deve | 110/346 X |
| 4,487,372 | 12/1984 | Deve | 110/236 X |
| 4,491,277 | 1/1985 | Baur et al. | 241/DIG. 10 |
| 4,493,636 | 1/1985 | Haldipur et al. | 110/245 X |
| 4,569,696 | 2/1986 | Sandstrom et al. | 241/DIG. 10 |

Primary Examiner—Edward G. Favors
Attorney, Agent, or Firm—Stevens, Davis, Miller & Mosher

[57] ABSTRACT

A method of cleaning contaminated soil which achieves very low levels of residual impurities and does not produce contaminated residues is characterized by the steps of, (a) feeding the contaminated soil to a combustion space (6) of a fluidized bed furnace (4) having, at the underside of said combustion space, a structure (5) for air distribution, (b) forming a fluidized bed of the contaminated soil above said air distribution structure (5) in the combustion space by means of combustion air delivered under elevated pressure via the air distribution structure, and (c) mainly or completely burning the impurities from the soil in the combustion space (6), to provide cleaned soil. Preferably the air distribution structure (5) comprises a generally horizontal grid (7) of pipes having air distribution nozzles with gaps between the pipes, coarse soil particles passing through said gaps into a collection space (13) from the combustion space.

14 Claims, 1 Drawing Figure

1

METHOD OF CLEANING CONTAMINATED SOIL

BACKGROUND OF THE INVENTION

1. Field of the Invention

The invention relates to a method of cleaning contaminated soil, for example soil from a former gas works.

2. Description of the Prior Art

One example of contaminated soil is soil from land on which a gas works formerly stood. Such soils, for example, may contain about 4000 ppm complex bound cyanide, or about 3500 ppm polycyclic aromatic hydrocarbons. These contents far exceed the values prescribed in the Chemical Waste Act (CWA) of The Netherlands of 5 and 0.1 ppm respectively.

The method according to the invention is extremely suitable for cleaning these contaminated soils from a former gasworks, given as an example, but can also be used for cleaning other contaminated soil.

Various methods are known for cleaning contaminated soil.

In the so-called "glowing method", the soil is heated to a temperature in the range 200° to 400° C. The contaminations then escape in gaseous form, and are destroyed in a post-combustion chamber. The degree of cleaning which can be obtained by this method is unsatisfactory because of the very low temperature.

The "flushing method" and "flotation method" are other known methods, but when using these methods not only cleaned soil but also residual matter containing the contaminants are obtained. This residual matter is a chemical waste, according to the provisions of the CWA, which must be disposed of either by storage or by further processing.

SUMMARY OF THE INVENTION

The object of the invention is to provide an improved method of cleaning contaminated soil, in which the above-mentioned disadvantages of the prior art methods are avoided, i.e. the soil is cleaned to below desired values, e.g. the values prescribed in the CWA, without leaving a residual substance with a high concentration of impurities.

According to the invention there is provided a method of cleaning contaminated soil comprising the steps of (a) feeding the contaminated soil to a combustion space of a fluidised bed furnace having, at the underside of said combustion space, a structure for air distribution, (b) forming a fluidized bed of the contaminated soil above said air distribution structure in the combustion space by means of combustion air delivered under elevated pressure via the air distribution structure, and (c) mainly or completely burning the impurities from the soil in the combustion space, to provide cleaned soil.

By the term "combustion air" there is here intended also air enriched with oxygen, see below.

In the fluidised bed combustion of combustible material, as known in practice, the material to be burned is fed into a fluidised bed of sand. The combustible material is burnt in the fluidised bed, whilst the gases formed during this process are burnt off in the section of the combustion chamber situated above the fluidised bed, the so-called burn-out chamber. Normally the ash is discharged with the flue gases. The sand bed wears away, and the fine fraction formed is also discharged with the flue gases so that the sand bed must be replenished from time to time.

In the present invention in contrast, the contaminated soil itself forms the fluidised bed, preferably with the addition of some additive material, as described below.

When the contaminated soil is fed to the fluidised bed furnace, and the soil is brought to a fluidised condition, the combustible impurities are then burnt in it, cleaning the contaminated soil. Depending on the grain distribution of the contaminated soil, and the coarse proportions present in them, such as stones, metal debris, gravel etc., a proportion of the cleaned soil, namely a fine fraction of it, will be discharged with the flue gases from the combustion space, but the bulk of the cleaned soil will remain in the fluidised bed. This would rapidly increase the height of the fluidised bed.

It is therefore necessary to drain the fluidised bed continuously or periodically, i.e. to discharge the cleaned soil from the bed. In the conventional design of the air distribution structure, called fluidised bed bottom below, this presents a problem, since the conventional fluidised bed bottom consists of a bottom plate which is provided with air distribution nozzles and one or more discharge ducts for draining the fluidised bed, but otherwise it is a closed. The space underneath the bottom plate is called the "air box". Combustion/fluidisation air is supplied to the air box under pressure.

When using this conventional design of the fluidised bed bottom in the method of the invention, the larger pieces of the contaminated soil will not fluidise but drop through the fluidised bed onto the bottom plate. They then play no further part in the fluidised bed. In the course of time this will disturb the fluidised bed, because only the finer grains are drained, leaving the larger pieces to accumulate. Since a certain grain distribution is required for good fluidisation, the large pieces must also be discharged.

Moreover, the fluidised bed material is replenished much faster when cleaning contaminated soil than the sand bed in a normal fluidised bed combustion furnace.

Therefore an air distribution structure of the so-called "live-bottom" type should preferably be used. It comprises a generally horizontal grid of pipes which are provided with air distribution nozzles, through which pipes and nozzles the combustion air is supplied under elevated pressure, there being gaps between the pipes by which the combustion chamber communicates openly with a space underneath the air distribution structure, particles of the soil passing down through these gaps from the fluidized bed. A coarse fraction of cleaned soil is discharged from the space underneath the air distribution structure, while a fine fraction of cleaned soil is discharged together with the flue gas from the combustion space and is then separated from the flue gas.

In this arrangement the closed bottom is replaced by a grid formed e.g. by parallel pipes on which air distribution nozzles are mounted.

Preferably a free gap of more than 50 mm, more preferably more than 80 mm, is provided between the pipes of the grid.

The cleaned soil becomes distributed uniformly over the bottom surface and can be discharged, after passing through the openings between the pipes.

For the combustion, gaseous, liquid or solid fuel supplied directly to the fluidised bed should preferably be used. Because of this, a smaller air excess can be used than when using burners to provide combustion heat.

With these arrangements, pieces of more than 50 or more than 80 mm size (even in the form of lumps) can be removed without problems, and in this case the cleaning effect is as good as that for the finer material.

The preferred temperature used in the method is about 800° C.

By the method the cyanides can be reduced to 2 ppm, and the hydrocarbons to 0.1 ppm or less. The flue gases which are released may be regarded as very clean.

As already mentioned, a specific grain distribution is required for good fluidisation. In some cases this grain distribution is already present in the soil to be cleaned. In other cases, however, the soil to be cleaned has a very fine grain distribution, which would mean that the process can be operated only at low capacity, since otherwise the fluidised bed is blown away. But in order to be able to operate at a high capacity, i.e. a high fluidisation rate, it is necessary to provide a grain distribution at or closer to the desired appropriate distribution.

Thus the contaminated soil should preferably be fluidised together with an additive to improve the grain distribution in the fluidised bed. For this purpose the contaminated soil should preferably be mixed with the additive before feeding to the combustion chamber of the fluidised bed combustion furnace. This produces a smoother soil which can be conveyed more easily.

Fresh sand with a "good" grain can be used as the additive. However, one of the fractions of the cleaned soil should preferably be used as the additive, and even more preferably the coarse fraction which is discharged downwardly from the fluidised bed, or a fine fraction obtained after screening of this coarse fraction.

In order to minimise the dimensions of the furnace, the furnace is preferably operated at the highest possible speed of the combustion air during fluidising. However, in order to maintain a reasonable burn-up time, a very tall furnace may be used. In this case the residence time in the burnup space or freeboard is sufficient to ensure complete cleaning. Because of the high speed, a great deal of cleaned soil is entrained with the flue gases and may be passed to a cyclone provided in the flue gas discharge, by which a fine fraction of cleaned soil is separated from the flue gases.

Combustion air enriched with oxygen is preferably used, more preferably combustion air with a oxygen content in the range 21 to 40%. This can considerably increase the capacity of the furnace without having to increase the fluidisation speed. If air enriched with 25 to 35% $O_2$ is used, the capacity of the furnace is twice as great as when using ordinary air.

DESCRIPTION OF THE PREFERRED EMBODIMENTS

Figure 1:
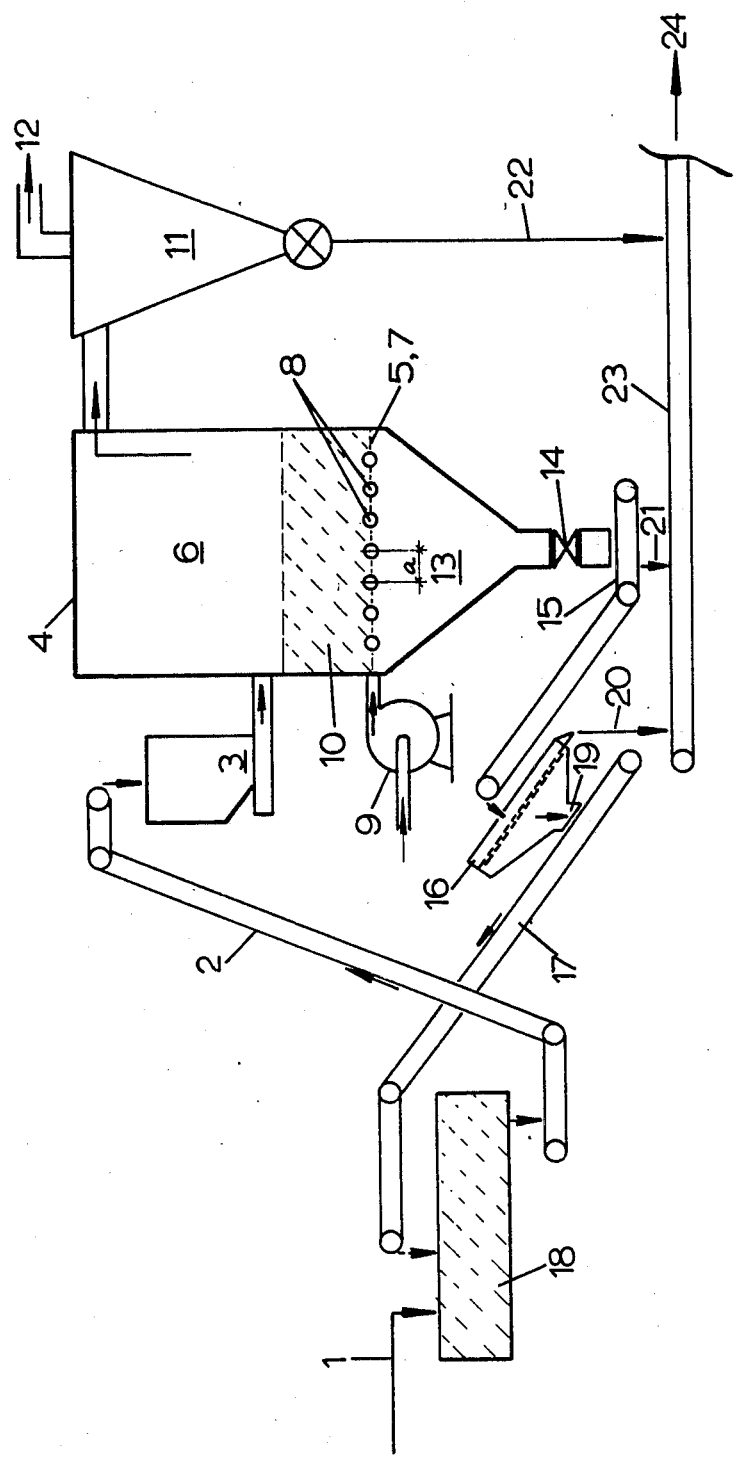

The preferred embodiment of the invention will be illustrated below by way of non-limitative example, with reference to the accompanying drawing, in the single figure of which there is shown a diagrammatic apparatus and flow chart for a method for cleaning contaminated soil according to the invention.

In the illustrated method, the contaminated soil is supplied at 1 and is fed into fluidised bed furnace 4 by means of a feed system comprising a feed belt 2 and a feeding device 3. The fluidised bed furnace consists of an air distribution and fluidised bed support structure 5 and a combustion chamber 6 above the structure 5.

The air distribution and structure 5 comprises a grid 7 of horizontal spaced parallel pipes 8, which are provided with air distribution nozzles (not shown). Combustion air is supplied at elevated pressure by means of a fan 9 into the pipes 8 and emerges from the nozzles.

In the combustion chamber the contaminated soil is brought by the combustion air into the fluidised condition on the air distribution structure thereby forming a fluidised bed 10.

Fuel is supplied (in a manner not shown) directly to the fluidised bed, by which the temperature is raised to about 800° C. so that the combustible impurities are burnt in the combustion chamber. If this combustion does not take place completely in the fluidised bed, the impurities are burnt up in the flue gases in the section of the combustion chamber situated above the fluidised bed, i.e. the so-called freeboard.

A fine fraction of the cleaned soil is entrained by the flue gases and is carried to a cyclone 11, where the fine fraction is separated as a flow 22. The flue gases thus freed from the fine fraction of cleaned soil are discharged at 12 and, if necessary, are subjected to flue gas cleaning.

A coarse fraction of cleaned soil drops through the gaps a between the pipes of the grid 7, into a collection space 13 under the grid 7, and is discharged from this space by means of a valve 14 by discharge belt 15. A part of this coarse fraction is screened in a sieve 16, and fine fraction 19 passing through the screen is fed by a belt 17 to a mixing device 18, and mixed in this device with the contaminated soil, to act as an additive in the soil in order to adjust the particle size distribution of the soil, thereby to improve it for the purpose of fluidisation.

The overflow 20 from the sieve 16 is discharged together with the unscreened portion of the coarse fraction 21 and the fine fraction 22 by a belt 23 as cleaned soil 24.

What is claimed is:

1. A method of cleaning contaminated soil comprising the steps of
   (a) feeding the contaminated soil to a combustion space of a fluidized bed furnace having, at the underside of said combustion space, a structure for air distribution,
   (b) forming a fluidized bed of the contaminated soil above said air distribution structure in the combustion space by means of combustion air delivered under elevated pressure via the air distribution structure, and
   (c) mainly or completely burning the imourities from the soil in the combustion space, to provide cleaned soil, said air distribution structure comprising a generally horizontal grid of pipes having air distribution nozzles, the combustion air passing in the pipes to the nozzles, there being gaps between the pipes and a collection space beneath the air distribution structure in communication via said gaps with the combustion space, coarse soil particles passing through said gaps into the collection space from the combustion space, whereby in the method a coarse fraction of cleaned soil is discharged via the collection space and a fine fraction of cleaned soil is discharged upwardly from the combustion space with flue gas and is separated from the flue gas.

2. A method according to claim 1 wherein said gaps provide a free passage more than 50 mm wide.

3. A method according to claim 2 wherein said gaps provide a free passage more than 80 mm wide.

4. A method according to claim 1 wherein fuel selected from gaseous, liquid and solid fuels is fed directly to the fluidised bed.

5. A method according to claim 1 including the step of mixing an additive with the contaminated soil to improve its grain distribution for fluidisation.

6. A method according to claim 5 wherein the said additive is mixed with the contaminated soil before the soil is fed to the combustion space.

7. A method according to claim 6 wherein the said additive is a fraction of the cleaned soil previously treated by the method.

8. A method according to claim 7 wherein said additive fraction is selected from a coarse fraction which has passed downwardly through the air distribution structure from the fluidised bed and a fine fraction obtained by screening such a coarse fraction which has passed downwardly through the air distribution structure from the fluidised bed.

9. A method according to claim 1 wherein the combustion air is enriched with oxygen.

10. A method according to claim 1 wherein the combustion air contains 21 to 40% by weight of oxygen.

11. A method according to claim 1 wherein the combustion air contains 25 to 35% by weight of oxygen.

12. A method according to claim 5 wherein the combustion air is enriched with oxygen.

13. A method according to claim 5 wherein the combustion air contains 21 to 40% by weight of oxygen.

14. A method according to claim 5 wherein the combustion air contains 25 to 35% by weight of oxygen.

* * * * *